Patented Jan. 30, 1951

2,539,504

UNITED STATES PATENT OFFICE 2,539,504

LUBRICATING COMPOSITION

William A. Zisman and Charles M. Murphy, Jr., Washington, D. C., and John K. Wolfe, Bethesda, Md.

No Drawing. Application February 3, 1945, Serial No. 576,106

8 Claims. (Cl. 252—37)

(Granted under the act of March 3, 1883, as amended April 30, 1928; 370 O. G. 757)

Our invention relates to lubricating compositions and deals specifically with the preparation of lubricants for the lubrication of bearing surfaces in instruments such as watches, meters, gyro compasses, gun sights, bomb sights, and in high speed motors and similar movements where an extremely low coefficient of friction is essential.

Lubrication of precision instruments or motors always presents a highly specialized and difficult problem since the parts must be enclosed and the lubricant cannot be renewed easily at frequent intervals, as is customary in common lubrication problems. In view of these factors, it is desirable to have a lubricant which will be non-volatile, non-corrosive, not subject to oxidation and, preferably, non-spreading. Since many delicate instruments are carried out of doors and, in modern military operations, are exposed in aircraft to violent extremes in temperature, the selection and compounding of the lubricant to be used on the many and minute bearing surfaces of delicate instruments is immensely complicated by external temperature, pressure and humidity conditions. In addition to non-oxidizability and non-corrosiveness, low viscosity at low temperature coupled with very small temperature coefficient of viscosity, good oiliness and extremely low volatility are necessary.

It is the principal object of our invention to provide a lubricant capable of giving satisfactory performance in all kinds of instruments or motors used in modern aircraft or ships or instruments used in scientific laboratories under the most exacting conditions or operations.

It is a second object of our invention to characterize our lubricants not only by their capacity to perform but also by their composition.

Other objects and advantages of our invention will in part be obvious and in part appear hereinafter.

Our invention accordingly comprises the lubricating compositions having the properties and relation of components which will be exemplified in the compositions hereinafter described and the scope of the invention will be indicated in the claims.

We have discovered that, in general, branched chain alkyl di-esters of dicarboxylic aliphatic acids, such as the branched chain alkyl di-esters of dicarboxylic acids having from five to twelve carbon atoms per molecule, alone or as mixtures of two or more esters, possess at least two desirable properties of good lubricants, namely, favorable viscosity indicies, and low pour points.

We have further discovered that a composition comprising essentially a branched-chain alkyl di-ester of azelaic acid, such as, di-(1-ethyl propyl) azelate, di-(butyl Cellosolve) azelate, di-(2-ethyl hexyl) azelate, and di-(2-ethyl butyl) azelate when properly compounded with certain oxidation, rust and spreading inhibitors give remarkable performance as lubricants in delicate instruments.

Our invention will be more clearly understood by reference to the following table in which the properties of several lubricants of this new class, are summarized and by further reference to the examples in which the method of compounding lubricanting compositions therefrom is described:

Table

| Property | Temp., °F. | Compound [1] | | | |
|---|---|---|---|---|---|
| | | I | II | III | IV |
| Viscosity, Centistokes. | 210 | 2.08 | 2.80 | 3.06 | 2.44 |
| | 130 | 4.45 | 6.20 | 7.20 | 5.30 |
| | 100 | 6.62 | 9.49 | 11.4 | 7.88 |
| | 77 | 9.62 | 13.9 | 17.4 | 11.5 |
| | 32 | 26.0 | 39.40 | 53.0 | 30.2 |
| | 0 | 68.4 | 110.0 | 158 | 79.1 |
| | −20 | 150 | | 393 | 220 |
| | −40 | 4.25 | | 1,200 | 472 |
| Slope Visc.-Temp. Curve (210 to −40) | | 0.79 | 0.70 | 0.74 | 0.75 |
| Specific Gravity | 25/4° C. | 0.933 | 0.972 | | |
| Surface Tension | 25° C. | 28 | 29 | | |
| Freezing Point, °C. | | −78 | −17 | | below −45° |
| Neutralization Number (after evap.) | | 0.01 | 1.12 | | |
| Weight change after evaporation [2] | | 0.34 | 0.62 | 0.05 | |
| Per Cent Viscosity change after evaporation | | 0.6 | 2.87 | | |

[1] Key to table:
I. di-(1-ethyl propyl) azelate
$(C_2H_5)_2CHOOC(CH_2)_7COOCH(C_2H_5)_2$
II. di-(butyl Cellosolve) azelate
$nC_4H_9OCH_2CH_2OOC(CH_2)_7COOCH_2CH_2OC_4H_9n$
III. di-(2-ethyl hexyl) azelate
$nC_4H_9CH(C_2H_5)CH_2OOC(CH_2)_7COOCH_2CH(C_2H_5)C_4H_9n$
IV. di-(2-ethyl butyl) azelate
$(C_2H_5)CHCH_2OOC(CH_2)_7COOCH_2CH(C_2H_5)_2$

[2] Volatility or per cent weight change after evaporation was measured by exposing a 10 gram sample of the fluid in an open dish having 16 square centimeters of surface area for 168 hours in a convection oven held at 150° F.

Although the pure esters described above have some of the essential characteristics of good lubricants, they are not adaptable, as such, to lubricating problems for they are too readily oxidized and do not protect the lubricated surfaces adequately against rusting under high humidity conditions. We have found that certain substituted phenols and amines such as cyclohexyl phenol, para hydroxy diphenyl, 4-tertiary butyl 2-phenyl phenol, p-hydroxy phenyl benzyl amine, thymol, and catechol when added to the base lubricant in small quantities are good oxidation inhibitors. They possess the valuable additional and essential property of excellent compatibility with the base lubricant for they do not precipitate from the composition at temperatures as low as minus 40° F.

We have found that polyvalent metallic soaps such as soaps of metals of the second group of the periodic table made from branched-chain carboxylic acids having more than five carbon atoms in the chain when added to the base lubricant in small quantity are generally quite effective as rust or corrosion inhibitors. For example, small amounts of zinc or calcium soaps of ethyl hexoic, phenyl stearic, phenoxy phenyl stearic, xenyl stearic, xylyl stearic, phenyl undecylic, ethyl octanoic or phenyl acetic acids effectively prevent rusting of lubricated surfaces.

The two types of soaps from the class indicated as being good rust inhibitors, that is, the zinc and calcium soaps, are exemplified by the following compounds: zinc di-(2-ethyl hexoate), zinc di-(phenyl stearate), zinc di-(phenoxy-phenyl stearate), zinc di-(xenyl stearate), zinc di-(xylyl stearate), zinc di-(phenyl undecylate), zinc di-(4-ethyl octanoate), zinc di-(phenyl acetate), calcium di-2-ethyl hexoate), calcium di-(phenyl stearate), calcium di-(phenoxy-phenyl stearate), calcium di-(xenyl stearate), calcium di-(xylyl stearate), calcium di-(phenyl undecylate), calcium di-(4-ethyl octanoate), calcium di-(phenyl acetate). These are especially advantageous in that they will not precipitate from solution in the oil even after long exposure to temperatures of minus 40° F.

The oxidation and rust inhibitors of the classes mentioned above are not only compatible with the base lubricant but are also mutually compatible and are effective in the various di-esters even when used in very low concentrations. We have found, for example, that concentrations of 0.10% by weight of our oxidation inhibitors and 0.2% of our rust inhibitors give a satisfactory amount of protection. When the oxidation inhibitors are used in relatively high concentrations, for example, one-fourth to about one per cent by weight, their effect is prolonged because the excessive amount added creates a reserve in the composition. In general, we have found it best, as a conclusion from exhaustive tests, to keep the concentration of inhibitors as low as possible to obtain the desired degree of inhibitation.

The volatility of the lubricant will largely be determined by the volatility of the base compound. From the figures given in the table, it is apparent that pure di-(1-ethyl propyl) azelate, di-(butyl Cellosolve) azelate and di-(ethyl hexyl) azelate are substantially involatile. Had the compounds tested been appreciably impure, that is, had they contained appreciable amounts of the alcohols and acids from which they were synthesized, their volatility according to the test used would have been considerably higher.

It is well known in the lubricating art that the viscosity characteristics of a lubricant can be adjusted by dissolving therein a polymer thickener. We have found that small amounts of the polyalkyl esters of acrylic acid such as the Acryloid resins (F10, HF845, HF880, products of Rohm and Haas and Co.) and polymers such as polybutenes dissolved in the lubricating compositions of Example IV alter their viscosities desirably. In general, their effect is to displace the viscosity-temperature curve in an upward direction with the effect being more pronounced in the high temperature range than in the low temperature range. Thereby the temperature coefficient of viscosity is decreased to some extent.

The polymers mentioned above have the valuable property of remaining in solution when the lubricating composition comes into contact with a petroleum oil or solvent. This prevents serious cleaning difficulties for, ordinarily, instruments are cleaned with petroleum solvents and should a polymer thickener be precipitated by the petroleum solvent the process would be seriously hampered.

It is quite apparent that in compounding a lubricant which in its final form is to contain several additives, care must be displayed in selecting the compounds to be used to insure that they will be mutually compatible. Enough different oxidation and rust and inhibitors can be found in the general classes mentioned above so that mutually compatible compounds can be selected. The additives must be compatible not only at room temperature but over the entire range of temperature in which it is expected the lubricant will function to avoid their interaction or precipiation.

Each of the compositions described in the examples given below was subjected to rust and oxidation stability tests. As a rust inhibitor test a sample of cold rolled steel was immersed in the composition and kept in contact with a drop of water for a period of 168 hours while maintained at a temperature of 140° F.

As an oxidation stability test, air was bubbled through a twenty-five gram sample at a rate of twenty milliliters per minute for 168 hours while the composition was maintained at a temperature of 100° C. Samples of copper, iron and Duralumin, each having a surface area of 1½ square inches were submerged in the samples of the compositions tested. Each composition was further subjected to a bomb test in which twenty-five grams of the composition having copper, iron and Duralumin samples submerged therein were held in a stainless steel bomb under a pure oxygen pressure of 125 pounds per square inch for a period of 168 hours.

The stability was judged in each case by the freedom of the test sample from significant viscosity and neutralization number changes and freedom from corrosion of the metals submerged in the sample.

The compounding of lubricating compositions according to our invention will be more readily understood by reference to the following examples:

Example I

Base lubricant____ di-(2-ethyl hexyl) azelate
Rust inhibitor____ 0.25% (wt.) zinc di-(xylyl stearate)
Oxidation inhibitor 0.20% (wt.) 4-tertiary butyl 2-phenyl phenol The compositions when tested for lubricating quality gave outstanding performance in the bearings of gyro compasses, clocks, and small synchro motors such as are used in fire control equipment. Its viscosity-temperature curve corresponds, within experimental error when it is prepared from the pure compound, to that of the pure compound. It was non-corrosive and stable as determined by the tests indicated above.

The above composition was clear and substantially water white before the tests; additives give a slight color to the compositions. It remained clear and substantially water white and free of precipitate after test even when stored at minus 65° F.

Example II

Base lubricant_____ di-(butyl Cellosolve) azelate
Rust inhibitor_____ 0.25% (wt.) calcium di-(phenyl stearate)
Oxidation inhibitor_____ 0.2% (wt.) diphenyl amine The composition when tested for lubrication quality gave outstanding performance, comparable to that of the composition of Example I. Its viscosity temperature curve corresponds, within experimental error when it is prepared from the pure compound, to that of the pure compound. It was colorless, non-corrosive and stable as determined by the tests outlined above and in Example I.

Example III

Base lubricant____ di-(2-ethyl hexyl) azelate
Rust inhibitor____ 0.25% (wt.) zinc di-(phenyl stearate)
Oxidation inhibitor 0.2% (wt.) para-hydroxydiphenyl The composition when tested for lubricating quality gave outstanding performance in the bearings of various aeronautical, navigation, and ordnance instruments. Its viscosity-temperature curve corresponds, within experimental error when it is prepared from the pure compound, to that of the pure compound. It was non-corrosive and stable as determined by the test outlined above and in Example I.

Example IV

Base lubricant_____ di-(2-ethyl butyl) azelate
Rust inhibitor_____ 0.25% (wt.) calcium di-(phenyl undecylate)
Oxidation inhibitor_____ 0.20% (wt.) cyclohexyl phenol The composition when tested for lubricating quality gave excellent performance in the bearings of various aeronautical, navigation and ordnance instruments. Its viscosity-temperature curve corresponds, within experimental error when it is prepared from the pure compound, to that of the pure compound. It was non-corrosive and stable as determined by the tests outlined above and in Example I.

Since various changes may be made in the above compositions by changing concentrations and combinations of additives and by mixing esters as base lubricants, thus making compositions different from those in the examples but coming within the scope of our invention, it is intended that all matter contained in the above table, description and examples shall be interpreted as illustrative and not in a limiting sense. It is also to be understood that the following claims are intended to cover all the generic and specific features of the invention which, as a matter of language, might be said to fall therebetween.

The invention described herein may be manufacured and used by or for the Government of the United States of America for governmental purposes without the payment of any royalty thereon or therefor.

Having described our invention, what we claim as new and desire to secure by Letters Patent of the United States is:

1. A fluid ester lubricating composition, consisting essentially of, di-(2-ethyl hexyl) azelate having dissolved therein about 0.1 to about 1.0 per cent by weight of zinc di-(xylylstearate) as a rust inhibitor and about 0.1 to about 1.0% by weight of 4-tertiary butyl 2-phenyl phenol as an oxidation inhibitor.

2. A fluid ester lubricating composition, consisting essentially of, as the base lubricant, di-(2-ethyl butyl) azelate blended with rust and oxidation inhibiting proportions, respectively, of a polyvalent metal soap of a substituted fatty acid as a rust inhibitor and a substituted phenolic compound as an oxidation inhibitor.

3. A fluid ester lubricating composition, consisting essentially of, as the base lubricant, di-(1-ethyl propyl) azelate blended with rust and oxidation inhibiting proportions, respectively, of a polyvalent metal soap of a substituted fatty acid as a rust inhibitor and a substituted phenolic compound as an oxidation inhibitor.

4. A fluid ester lubricating composition, consisting essentially of, as the base lubricant di-(2-ethyl butyl) azelate and having dissolved therein about 0.1% to 1.0% by weight of calcium di-(xylyl stearate) as rust inhibitor and about 0.1% to 1.0% by weight of 4-tertiary butyl-2-phenyl phenol as an oxidation inhibitor.

5. A fluid ester lubricating composition consisting essentially of, as the base lubricant di-(1-ethyl propyl) azelate having dissolved therein about 0.1% to 1.0% by weight of calcium di-(xylyl stearate) as a rust inhibitor and about 0.1% to 1.0% by weight of 4-tertiary butyl-2-phenyl phenol as an oxidation inhibitor.

6. A fluid ester lubricating composition, consisting essentially of, as the base lubricant, a branched-chain, lower alkyl di-ester of azelaic acid blended with rust and oxidation inhibiting proportions, respectively, of a polyvalent metal soap of a saturated fatty acid substituted by an organic radical selected from the group consisting of aryl and alkylaryl radicals as a rust inhibitor and a phenolic compound substituted by an organic radical selected from the group consisting of aryl, alkyl, alkylaryl and amino radicals as an oxidation inhibitor.

7. A fluid ester lubricating composition consisting essentially of, as the base lubricant, di-(2-ethylhexyl) azelate blended with rust and oxidation inhibiting proportions, respectively, of a polyvalent metal soap of a saturated fatty acid substituted by an organic radical selected from the group consisiting of aryl and alkylaryl radicals as a rust inhibitor and a phenolic compound substituted by an organic radical selected from the group consisting of aryl, alkyl, alkylaryl and amino radicals as an oxidation inhibitor.

8. A fluid ester lubricating composition, consisting essentially of, as a base lubricant di-(2-ethyl hexyl) azelate blended with rust and oxidation inhibiting proportions, respectively, of a polyvalent metal soap of a saturated fatty acid substituted by an organic radical selected from the group consisting of aryl and alkylaryl radicals as a rust inhibitor, a phenolic compound substituted by an organic radical selected from the group consisting of aryl, alkyl, alkylaryl and amino radicals as an oxidation inhibitor and a polymer thickener.

WILLIAM A. ZISMAN.
CHARLES M. MURPHY, Jr.
JOHN K. WOLFE.

REFERENCES CITED

The following references are of record in the file of this patent:

UNITED STATES PATENTS

| Number | Name | Date |
|---|---|---|
| 2,417,281 | Wasson | Mar. 11, 1947 |